(12) United States Patent
Newman

(10) Patent No.: US 11,283,373 B2
(45) Date of Patent: Mar. 22, 2022

(54) PIEZOELECTRIC POWER APPARATUS

(71) Applicant: Edwin Steven Newman, Palmdale, CA (US)

(72) Inventor: Edwin Steven Newman, Palmdale, CA (US)

(*) Notice: Subject to any disclaimer, the term of this patent is extended or adjusted under 35 U.S.C. 154(b) by 0 days.

(21) Appl. No.: 17/308,320

(22) Filed: May 5, 2021

(65) Prior Publication Data

US 2021/0257939 A1    Aug. 19, 2021

Related U.S. Application Data

(63) Continuation-in-part of application No. 15/877,135, filed on Jan. 22, 2018, now abandoned.

(51) Int. Cl.
*H02N 2/18* (2006.01)
*F03B 13/08* (2006.01)

(52) U.S. Cl.
CPC .......... *H02N 2/185* (2013.01); *F03B 13/08* (2013.01); *F05D 2220/76* (2013.01)

(58) Field of Classification Search
CPC ......... H02N 2/185; F03B 13/08; F03B 13/00; F05D 2220/76; F05B 2220/20; F05B 2220/709; F05B 2260/506; Y02E 10/20
USPC ........................................................ 310/339
See application file for complete search history.

(56) References Cited

U.S. PATENT DOCUMENTS

| | | | |
|---|---|---|---|
| 2,408,816 A * | 10/1946 | Shapiro | B06B 1/0662 310/338 |
| 4,184,807 A | 1/1980 | Berg | |
| 5,178,361 A * | 1/1993 | Gilbert | H02P 1/04 251/129.05 |
| 8,516,812 B2 | 8/2013 | Manakkattupadeettathil | |
| 9,097,240 B1 | 8/2015 | Langmann | |
| 10,514,019 B2 * | 12/2019 | Dayson | H02N 2/18 |
| 2001/0035510 A1 * | 11/2001 | Oh | F16K 31/535 251/129.03 |
| 2005/0224050 A1 | 10/2005 | Schmitfranz et al. | |
| 2012/0097752 A1 * | 4/2012 | Okano | B01F 3/04978 239/1 |
| 2015/0101323 A1 | 4/2015 | Newman | |
| 2017/0128898 A1 * | 5/2017 | Okano | B05B 17/0615 |

FOREIGN PATENT DOCUMENTS

WO    WO-2010032622 A1 *    3/2010    ............. H02N 2/186

OTHER PUBLICATIONS

Attached STIC NPL search report from EIC 2800 searcher Heidi Myers. (Year: 2021).*

* cited by examiner

*Primary Examiner* — Shawki S Ismail
*Assistant Examiner* — Htet Z Kyaw
(74) *Attorney, Agent, or Firm* — Kelly & Kelley, LLP

(57) ABSTRACT

A piezoelectric power apparatus wherein piezoelectric material forms one wall of a liquid-filled container. Water pressure within the container is made to rapidly vary either by a cam operated piston or a motor operated ball valve acting on a pressurized liquid flow. The piston reciprocates through a wall of the container to alternately increase and decrease the pressure in the liquid. The ball valve periodically interrupts the pressurized liquid flow to alternately increase and decrease the pressure in the liquid. In either case, the alternate increase and decrease in the pressure in the liquid creates pressure variations in the piezoelectric material.

11 Claims, 2 Drawing Sheets

PIEZOELECTRIC POWER APPARATUS

RELATED APPLICATIONS

This application is a continuation-in-part of co-pending U.S. application Ser. No. 15/877,135 filed Jan. 22, 2018.

BACKGROUND OF THE INVENTION

The present invention is directed to a power apparatus that utilizes pressure variations acting on a piezoelectric material to generate electrical power. Specifically, the inventive power apparatus includes exposes a waterproofed piezoelectric material to fluctuating water pressure to generate electrical power.

In previously-filed patent application published as US2017/0366106 there is described a water-filled chamber with multiple inlet and outlet pipes, each containing a solenoid operated valve. The inlet pipes are operatively connected to a water source at a high elevation. The outlet pipes are operatively connected to a water reservoir at a lower elevation than the chamber. Opening and then closing each outlet and inlet pipe in succession produces waves of water pressure within the chamber. The solenoids are operated by a rotary electric switch operated in turn by a motor.

The inventor has found that the waves of pressure produced using solenoid operated valves are produced at a frequency that is only about one or two Hertz. If waterproofed piezoelectric material within such a chamber exposed to such a low frequency is to be made to produce electric power in sufficient quantities, electrical resistance within the material must be significantly minimized. Therefor the area of the faces of the piezoelectric material must be greatly increased and the thickness greatly reduced. These requirements significantly increase the cost of manufacturing the material.

Accordingly, there is a need for an improved piezoelectric power apparatus that produces sufficient quantities of electric power without requiring increased surface area and reduced thickness, as by producing a greater frequency of pressure fluctuations. The present invention fulfills these needs and provides other related advantages.

SUMMARY OF THE INVENTION

The present invention is directed to a power apparatus that utilizes pressure variations acting on a piezoelectric material to generate electrical power. The inventive apparatus is presented with a closed container filled with water and containing a piezoelectric material connected to an electrical grid. A piston passes through a hole in a wall of the container, said piston capable of pressurizing and depressurizing the water in the container, which in turn exerts pressure on the enclosed piezoelectric material, producing electric power that is transferred to the electrical grid.

The piston may be activated hydrodynamically by the rotating of a ball valve, which is made to alternately obstruct and allow the flow of a second liquid through piping operatively connected to the piston. Alternatively, the piston may be activated mechanically through connection to a rotating cam attached to and operated upon by a turbine located in a stream of the second liquid.

The aim of the present invention is to increase the frequency of the pressure waves to decrease the amount of piezoelectric material needed to produce electrical power.

The present invention is directed to an energy conversion apparatus having an enclosed vessel wherein a first wall of the vessel is a piezoelectric sheet with an entire perimeter edge secured in a flange around the first wall of the vessel such that the piezoelectric sheet is hermetically sealed to the vessel. A pair of conductors is electrically connected to the piezoelectric sheet. A liquid completely fills the entire volume of the enclosed vessel and is in physical contact with the piezoelectric sheet. A further apparatus is provided for creating pressure oscillations in the liquid within the enclosed vessel so as to create pressure fluctuations in the piezoelectric sheet.

The liquid is preferably a dielectric liquid. The piezoelectric sheet is preferably electrically insulated from the liquid, particularly if the liquid is not a dielectric.

In one preferred embodiment, the apparatus for creating pressure oscillations has a reciprocating piston sealingly passing through a second wall of the enclosed vessel. An eccentric cam is operatingly connected to the reciprocating piston, wherein revolution of the eccentric cam reciprocates the piston through the second wall.

In another preferred embodiment, the vessel includes an inlet flow pipe and an outlet flow pipe, both fluidly connected to the liquid within the enclosed vessel. The inlet flow pipe and outlet flow pipe provide a pressurized flow of the liquid through the vessel. The apparatus for creating pressure oscillations has a valve disposed in the outlet flow pipe that opens and closes to selectively permit and obstruct the pressurized flow of the liquid through the outlet flow pipe. The valve is preferably a ball valve rotatingly connected to a motor by a shaft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
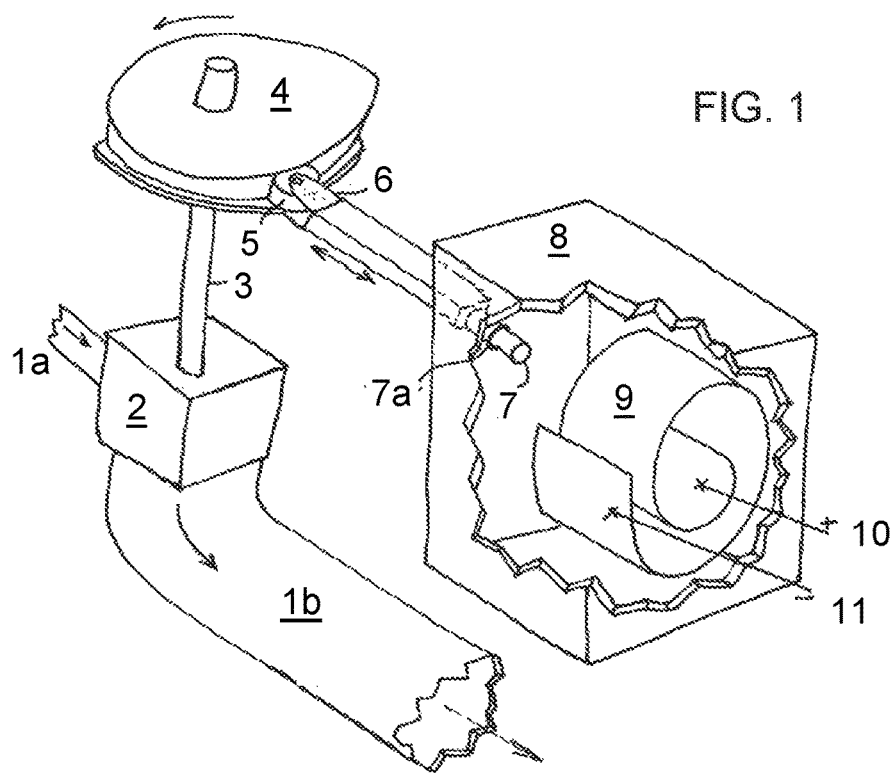
FIG. 1 is a perspective view of a first preferred embodiment of the inventive piezoelectric power apparatus.
Figure 2:
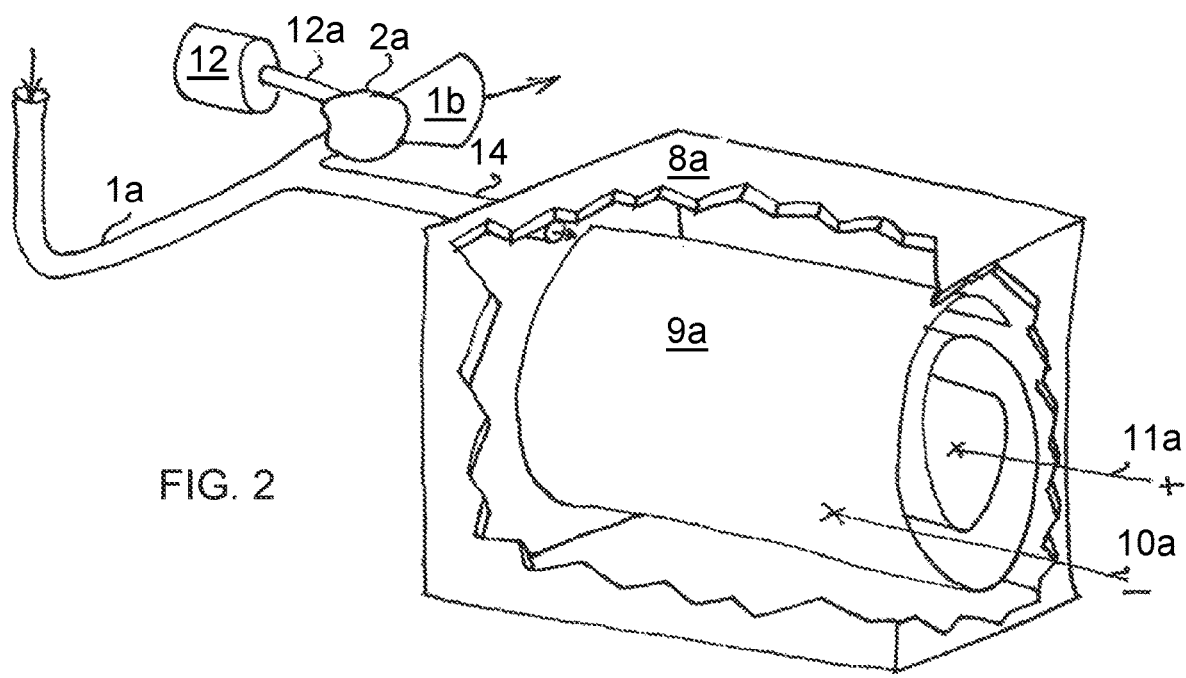
FIG. 2 is a perspective view of a second preferred embodiment of the inventive piezoelectric power apparatus.
Figure 3:
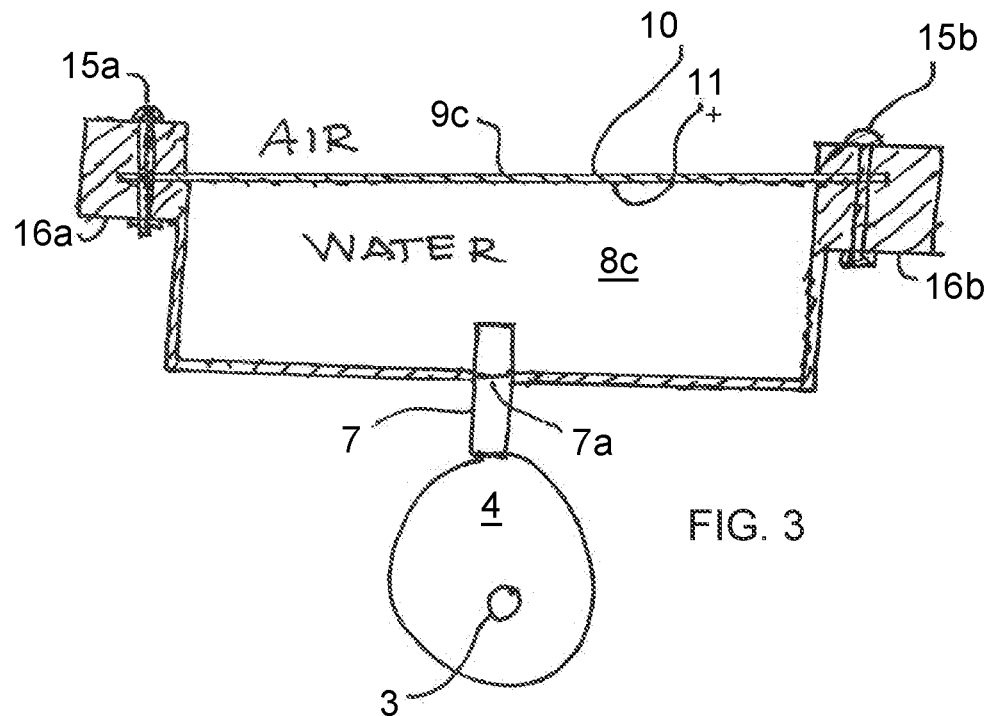
FIG. 3 is a perspective view of a third preferred embodiment of the inventive piezoelectric power apparatus.
Figure 4:
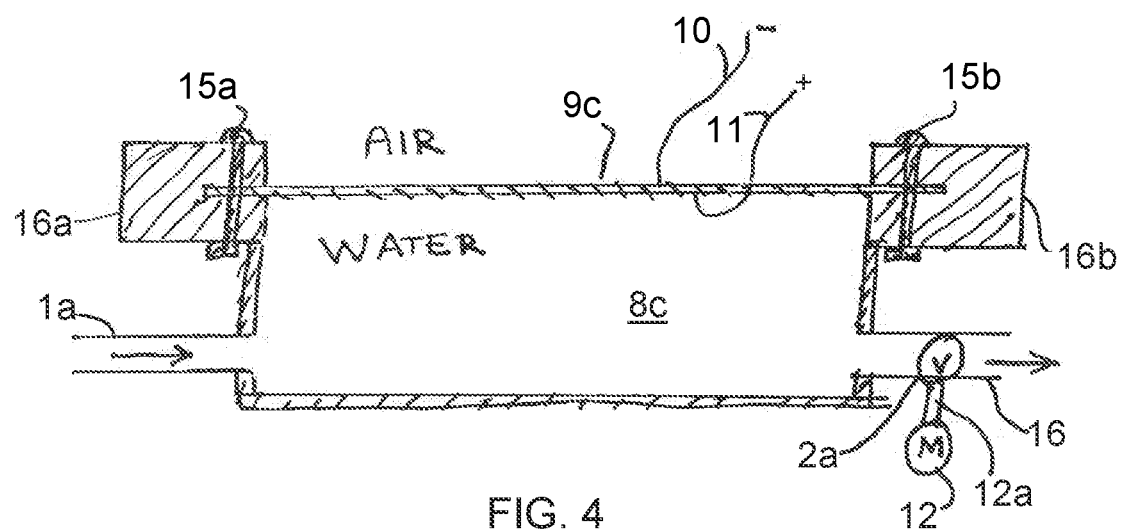
FIG. 4 is a perspective view of a fourth preferred embodiment of the inventive piezoelectric power apparatus.

The present invention is directed to a power apparatus that utilizes pressure variations acting on a piezoelectric material to generate electrical power. FIGS. 1-2 illustrate the first and second preferred embodiments of the inventive piezoelectric power apparatus described herein. FIGS. 3-4 illustrate the third and fourth preferred embodiments of the inventive piezoelectric power apparatus described herein.

First Preferred Embodiment

Turning to FIG. 1 we see a turbine 2 is operatively connected to a pipe 1a, 1b, wherein a fluid flow therein passes through and acts upon the turbine 2. A rotating cam 4 is in turn operatively connected to turbine 2 through the agency of shaft 3. Bracket 6 holds wheel 5 in place against the cam 4, with bracket 6 fixedly attached to and operative on piston 7. Wheel 5 is positioned so its outer rim is operatively connected to the outer rim of cam 4. As cam 4 rotates eccentrically about shaft 3, the position of wheel 5 and bracket 6 reciprocates in line with piston 7.

Sealed container 8 is provided so as to contain piezoelectric material 9 (shown in the form of a loosely rolled sheet). The piezoelectric material 9 is illustrated as a coiled sheet to increase the available surface area within a fixed volume of the sealed container 8. The sealed contained 8 is completely filled with a liquid, preferably without having any air pockets in the container 8. The liquid within container 8 may be a dielectric such as purified water, transformer oil, or perfluoroalkanes. If the liquid is not a dielectric then piezoelectric material 9 must be electrically insulated from the liquid by, for example, a rubber envelope.

The piston 7 passes through a wall of container 8. O-ring 7a is located circumferentially around piston 7 to seal the point of contact between piston 7 and the wall of the container 8, so as to prevent the liquid within container 8 from escaping through the hole through which piston 7 is made to enter the interior of container 8. Electric leads 10, 11 are electrically connected to opposite sides of the piezoelectric material 9 and extend through a wall of container 8. Outside of container 8, the electric leads 10, 11 are electrically connected to an electrical grid (not shown).

In operation, the fluid made to flow through pipe 1a, 1b turns turbine 2 and shaft 3, which causes cam 4 to revolve. Revolution of cam 5 causes the wheel 5, bracket 6, and piston 7 to reciprocate. The reciprocating piston 7 into and out of sealed container 8 causes the liquid within container 8, as well as, the surfaces of piezoelectric material 9 to be alternately pressurized and depressurized. The alternating pressurization and depressurization of the piezoelectric material 9 generates electrical power, which power output is conducted by leads 10, 11 to the electrical grid.

Second Preferred Embodiment

A second preferred embodiment of the power apparatus is presented in FIG. 2, which is similar in structure to the first preferred embodiment insofar as it has a sealed container 8a enclosing a piezoelectric material 9a connected to electrical leads 10a, 11a that pass through a wall of the container 8a to an electrical grid (not shown). The sealed container 8a is filled completely with a liquid as described above.

Rather than the piston 7 of the first preferred embodiment, the second preferred embodiment has a connector pipe 14 in fluid communication with the interior of the container 8a. The connector pipe 14 extends away from the container 8 and is fluidly connected (as by a T-connector or similar plumbing) to a liquid flow pipe 1a, 1b with a pressurized stream of the liquid flowing therethrough. The pressurized stream of liquid flows in the inflow portion 1a of the fluid flow pipe and out the outflow portion 1b thereof. Downstream of the connector pipe 14, the outflow pipe 1b includes a ball valve 2a or similar closure mechanism. A motor 12 is operatively connected to ball valve 2a through the agency of shaft 12a to selectively open and close the outflow pipe 1b.

Connector pipe 14 branches off from fluid flow pipe 1a, 1b and is in fluid communication with the interior of container 8a. The pressurized liquid within flow pipe 1a, 1b is preferably a dielectric such as purified water and is directed into container 8a by connector pipe 14. If the liquid is not a dielectric then piezoelectric material 9a must be electrically insulated from the liquid by, for example, a rubber envelope.

In operation, the pressurized liquid is allowed to flow intermittently through ball valve 2a as it is selectively opened and closed by operating motor 12. When the ball valve 2a is closed, the pressurized liquid in flow pipe 1a is directed through connector pipe 14 to the container 8a increasing the pressure therein. When the ball valve 2a is opened, the pressurized liquid in flow pipe 1a is directed through outflow pipe 1b away from connector pipe 14 and the container 8a decreasing the pressure therein. As connector piper 14 operatively connects the forced liquid flow in flow pipe 1a to container 8a the pressure on piezoelectric material 9a is made to vary at a rate dependent on the rate at which ball valve 2a is made to revolve. The resultant power output is taken off by leads 10a, 11a to the grid (not shown).

Piezo films, like all piezoelectric materials, are dynamic materials that develop and electrical charge proportional to changes in mechanical stress. The power formula for piezoelectric power conversion is Power (in Watts) equals the square of the Voltage divided by twice the Resistance (in Ohms). The maximum working Voltage is about 700 volts depending upon the pressure and piezoelectric material being used. The maximum Voltage may also be increased depending upon how the apparatus is wired to the grid.

To optimize power production from the apparatus, the Resistance of the piezoelectric material must be lowered. Resistance (in Ohms) is equal to the thickness (in cm) divided by the angular velocity (in Rads/second) times the surface area (in cm$^2$) times the permittivity constant ($\epsilon$) to the s power (in units of Columbs$^2$/N·m$^2$). Resistance is lowered by minimizing the thickness of the piezoelectric material while increasing the surface area, which reacts most favorably to relatively low frequency pressure fluctuations.

Third Preferred Embodiment

A third preferred embodiment of the power apparatus is presented in FIG. 3, which operates on a similar principle to the first preferred embodiment but presents a container 8c wherein one wall is a piezoelectric material 9c connected to electrical leads 10, 11 that connect to an electrical grid (not shown). The piezoelectric material 9c is in the form of a sheet with the edges disposed in a flange 16a, 16b that surrounds the entire perimeter of the container 8c and held in place by retainer bolts 15a, 15b or similar fasteners.

The container 8c is filled completely with a liquid that is in physical contact with the entire exposed surface area of the piezoelectric sheet 9c inside of the container 8c, similar to that as described above. The opposite side surface area of the piezoelectric sheet 9c, i.e., outside of the container 8c, is exposed to open air, not backed by any portion of the container 8c other than by the flange 16a, 16b around the edges. The piezoelectric material 9c is hermetically sealed with all edges of the flange 16a, 16b so as to retain all liquid within the container 8c. A piston 7 passes through a wall of the container 8c, sealed by gasket 7a. An eccentric cam wheel 4 engages with piston 7. As cam 4 rotates about point 3, the piston 7 is reciprocated back and forth to create pressure fluctuations in the liquid in container 8c. The pressure fluctuations in the liquid exert forces on the piezoelectric material 9c to generate electrical power as described above. By having the piezoelectric material 9c as one side of the container 8c, the pressure fluctuations are more reliably and effectively captured to generate electrical power.

Fourth Preferred Embodiment

A fourth preferred embodiment of the power apparatus is presented in FIG. 4, which operates on a similar principle to earlier embodiments. As with the third embodiment, a container 8c is presented wherein one wall is a piezoelectric material 9c connected to electrical leads 10, 11 that connect to an electrical grid (not shown). The piezoelectric material 9c is in the form of a sheet with the edges disposed in a flange 16a, 16b that surrounds the entire perimeter of the container 8c and held in place by retainer bolts 15a, 15b or similar fasteners.

The container 8c is filled completely with a liquid as described above. The piezoelectric material 9c is hermetically sealed with all edges of the flange 16a, 16b so as to retain all liquid within the container 8c. Different from earlier embodiments, one side of the container 8c has an inlet flow pipe 1a and another side has an outlet flow pipe 1b. A pressurized stream of liquid flows in through inlet pipe 1a and out through outlet flow pipe 1b. Disposed in the outlet pipe 1b downstream of the container 8c is a ball valve 2a or similar closure mechanism. A motor 12 is operatively connected to ball valve 2a through shaft 12a to selectively open and close the outlet pipe 1b.

The pressurized stream of liquid within flow pipes 1a, 1b is preferably a dielectric such as purified water and is directed into container 8c through inlet pipe 1a and exits from outlet pipe 1b. If the liquid is not a dielectric then piezoelectric material 9a must be electrically insulated from the liquid by, for example, a rubber envelope.

In operation, the pressurized flow of liquid is allowed to flow intermittently through ball valve 2a as it is selectively opened and closed by operating motor 12. When the ball valve 2a is closed, the pressurized liquid in inlet pipe 1a increases the pressure in container 8c. When the ball valve 2a is opened, the pressurized liquid flow is released through outflow pipe 1b and the pressure in container 8c is decreased. As the pressure alternately increases and decreases in container 8c, the pressure on piezoelectric material 9c is made to vary at a rate dependent on the rate at which ball valve 2a is made to revolve. The resultant power output is taken off by leads 10, 11 to the grid (not shown).

As the liquid flow is blocked and released in outlet pipe 1b, the pressure in container 8c fluctuates. The pressure fluctuations in the liquid exert forces on the piezoelectric material 9c to generate electrical power as described above. By having the piezoelectric material 9c as one side of the container 8c, the pressure fluctuations are more reliably and effectively captured to generate electrical power.

A typical hydroelectric generator operates at a frequency of about 50 Hertz. As mentioned above, waves of pressure generated in liquid using solenoid operated valves are produced at a frequency that is typically only about 1-2 Hertz. While pressure oscillations of 1-2 Hertz are sufficient to produce electrical power from a piezoelectric material, an increased surface area of piezoelectric material is needed to produce an appreciable amount of electrical power. As the pressure frequency increases, the surface area of piezoelectric material needed to produce an appreciable amount of electrical power decreases. The cost of providing piezoelectric material for the apparatus is directly proportional to the surface area.

In each of the above described embodiments, the liquid preferably fills the interior space of the container 8, 8c completely such that there are no air bubbles and the liquid is in contact with the entire surface of the piezoelectric material 9, 9c. By assuring that the liquid is in contact with the entire surface of the piezoelectric material 9, 9c, the pressure from the oscillations in the liquid is evenly distributed across the surface of the piezoelectric material 9, 9c. Such even distribution of the pressure on the piezoelectric material 9, 9c allows for increased effectiveness of the power generation at a reduced surface area of piezoelectric material to produce an appreciable amount of electrical power.

From the above descriptions it is apparent that the preferred embodiments achieve the object of the invention. The disclosed embodiments are merely exemplary of the invention, which may be embodied in various forms. Alternative embodiments and various depictions of the present embodiments will be apparent to those skilled in the art. Various modifications may be made without departing from the scope and spirit of the invention. Accordingly, the invention is not to be limited, except as by the appended claims.

What is claimed is:

1. An energy conversion apparatus comprising:
   an enclosed vessel wherein a first wall of the vessel is a piezoelectric sheet with an entire perimeter edge secured in a flange around the first wall of the vessel such that the piezoelectric sheet is hermetically sealed to the vessel;
   a pair of conductors electrically connected to the piezoelectric sheet;
   a liquid completely filling an interior volume of the enclosed vessel and in physical contact an entire exposed surface area of the piezoelectric sheet wherein an entire exposed surface area of the piezoelectric sheet exterior to the enclosed vessel is in physical contact with air and not backed by any portion of the vessel other than the flange; and
   a means for creating pressure oscillations in the liquid within the enclosed vessel so as to create pressure fluctuations in the piezoelectric sheet.

2. The energy conversion apparatus of claim 1, wherein the liquid is a dielectric liquid.

3. The energy conversion apparatus of claim 1, wherein the piezoelectric sheet is electrically insulated from the liquid.

4. An energy conversion apparatus comprising:
   an enclosed vessel wherein a first wall of the vessel is a piezoelectric sheet with an entire perimeter edge secured in a flange around the first wall of the vessel such that the piezoelectric sheet is hermetically sealed to the vessel;
   a pair of conductors electrically connected to the piezoelectric sheet;
   a liquid completely filling an interior volume of the enclosed vessel and in physical contact an entire exposed surface area of the piezoelectric sheet, wherein an entire exposed surface area of the piezoelectric sheet exterior to the enclosed vessel is in physical contact with air and not backed by any portion of the vessel other than the flange; and
   a reciprocating piston sealingly passing through a second wall of the enclosed vessel.

5. The energy conversion apparatus of claim 4, further comprising an eccentric cam operatingly connected to the reciprocating piston, wherein revolution of the eccentric cam reciprocates the piston within the second wall.

6. The energy conversion apparatus of claim 4, wherein the liquid is a dielectric liquid.

7. The energy conversion apparatus of claim 4, wherein the piezoelectric sheet is electrically insulated from the liquid.

8. An energy conversion apparatus comprising:
   an enclosed vessel wherein a first wall of the vessel is a piezoelectric sheet with an entire perimeter edge secured in a flange around the first wall of the vessel such that the piezoelectric sheet is hermetically sealed to the vessel;

a pair of conductors electrically connected to the piezoelectric sheet;

a liquid completely filling an interior volume of the enclosed vessel and in physical contact an entire exposed surface area of the piezoelectric sheet, wherein an entire exposed surface area of the piezoelectric sheet exterior to the enclosed vessel is in physical contact with air and not backed by any portion of the vessel other than the flange; and an inlet flow pipe and an outlet flow pipe fluidly connected to the enclosed vessel that provides a pressurized flow of the liquid to the vessel, and a valve disposed in the outlet flow pipe that opens and closes to selectively permit and obstruct the pressurized flow of the liquid through the outlet flow pipe.

9. The energy conversion apparatus of claim 8, wherein the valve is a ball valve rotatingly connected to a motor by a shaft.

10. The energy conversion apparatus of claim 8, wherein the liquid is a dielectric liquid.

11. The energy conversion apparatus of claim 8, wherein the piezoelectric sheet is electrically insulated from the liquid.

* * * * *